(12) United States Patent
Ota et al.

(10) Patent No.: US 8,221,643 B2
(45) Date of Patent: Jul. 17, 2012

(54) LUBRICATING OIL COMPOSITION FOR COMPRESSION REFRIGERATOR HAVING TRACTION MECHANISM

(75) Inventors: Masaki Ota, Aichi (JP); Masato Kaneko, Chiba (JP); Hitoshi Hata, Chiba (JP); Toshiyuki Tsubouchi, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 12/438,141

(22) PCT Filed: Jul. 10, 2007

(86) PCT No.: PCT/JP2007/063745
§ 371 (c)(1),
(2), (4) Date: Feb. 20, 2009

(87) PCT Pub. No.: WO2008/026385
PCT Pub. Date: Mar. 6, 2008

(65) Prior Publication Data
US 2010/0237274 A1    Sep. 23, 2010

(30) Foreign Application Priority Data

Aug. 31, 2006   (JP) ................................. 2006-235279

(51) Int. Cl.
*C09K 5/04* (2006.01)
*C10M 127/00* (2006.01)
*F25B 9/00* (2006.01)

(52) U.S. Cl. .............................. 252/68; 508/501; 62/468
(58) Field of Classification Search ..................... 252/68; 508/501; 62/468
See application file for complete search history.

(56) References Cited

U.S. PATENT DOCUMENTS

| | | | | |
|---|---|---|---|---|
| 6,074,573 | A * | 6/2000 | Kaneko | 252/68 |
| 6,319,879 | B1 * | 11/2001 | Yoshida et al. | 508/110 |
| 7,018,961 | B2 * | 3/2006 | Tazaki | 508/579 |
| 7,392,737 | B2 * | 7/2008 | Mayorca | 92/69 B |
| 2002/0072476 | A1 * | 6/2002 | Yoshida et al. | 508/110 |
| 2003/0158056 | A1 * | 8/2003 | Ikeda | 508/579 |
| 2004/0171898 | A1 * | 9/2004 | Tsubouchi et al. | 585/22 |
| 2010/0029524 | A1 * | 2/2010 | Fujinami et al. | 508/496 |

FOREIGN PATENT DOCUMENTS

| | | |
|---|---|---|
| EP | 0 968 987 | 1/2000 |
| EP | 1 201 733 | 5/2002 |
| EP | 1 391 499 | 2/2004 |
| EP | 1 672 050 | 6/2006 |
| JP | 55 161895 | 12/1980 |
| JP | 05 231313 | 9/1993 |
| JP | 09 221690 | 8/1997 |
| JP | 2000 273479 | 10/2000 |
| JP | 2002 348584 | 12/2002 |
| WO | 98 58042 | 12/1998 |
| WO | WO 2004090338 A2 * | 10/2004 |

OTHER PUBLICATIONS

U.S. Appl. No. 12/595,837, filed Oct. 14, 2009, Kaneko, et al.
U.S. Appl. No. 12/595,693, filed Oct. 13, 2009, Kaneko, et al.
"Santotrac 50 Traction Lubricant", Jun. 17, 2009, XP55005443, Retrieved from the Internet: URL:http://www.santovac.com/resources/tds-msds/MSDS-SANTOTRAC-50.pdf.
Extended European Search Report issued Sep. 6, 2011 in Application No. EP 07790563.6, PCT/JP2007063745.

* cited by examiner

*Primary Examiner* — Douglas Mc Ginty
(74) *Attorney, Agent, or Firm* — Oblon, Spivak, McClelland, Maier & Neustadt, L.L.P.

(57) ABSTRACT

The present invention provides a lubricating oil composition for a compression type refrigerator, containing a base oil having a kinematic viscosity of 2 to 1,000 mm$^2$/s at 40° C. The base oil contains the following compounds (1) to (6) each having a molecular weight of 150 to 5,000 and a tertiary or quaternary carbon: (1) an alicyclic hydrocarbon, (2) a branched carboxylic acid ester of a polyhydric alcohol, (3) an alicyclic polycarboxylic acid ester, (4) polybutene, (5) an alkyl benzene and/or an alkyl naphthalene, and (6) a paraffinic mineral oil showing a $^{13}$C-NMR spectrum in which an area of peaks at chemical shifts in the range of 30 to 100 ppm accounts for 5 to 40% of the entire peak area and/or a naphthenic mineral oil having a naphthene content of 30 to 70% by mass. The composition has excellent traction performance, lubricating properties and stability.

13 Claims, No Drawings

LUBRICATING OIL COMPOSITION FOR COMPRESSION REFRIGERATOR HAVING TRACTION MECHANISM

This application is a 371 of PCT/JP2007/063745, filed Jul. 10, 2007.

TECHNICAL FIELD

The present invention relates to a lubricating oil composition for a compression type refrigerator having a traction mechanism and, more specifically, to a lubricating oil composition which shows excellent traction performance in a refrigerant atmosphere as well as excellent lubricating properties and stability and which is suited for use in various compression type refrigerators having a traction mechanism, in particular in an open-type refrigeration apparatus.

BACKGROUND ART

In a conventional compression type refrigerator, particularly a compression refrigerator for a car air conditioner, there has been used a variable displacement-type refrigeration apparatus provided with a variable mechanism in which an angle of a slanted plate is changed to adjust the stroke of a piston.

With such a system in which the stroke of the piston is controlled, however, an excess load is applied to the piston to cause wear or seizure thereof.

In recent years, variable speed compressor in which a traction drive mechanism is provided within the compressor to control the speed of a piston has been developed.

A lubricating oil composition for use in such a compression type refrigerator is required not only to have excellent lubricating properties and stability that have been demanded of a lubricating oil composition for the conventional refrigeration apparatus but also to exhibit suitable traction performance.

No lubricating oil compositions for a compression type refrigerator have been found, however, that have high traction performance, in particular that have a high traction coefficient in a refrigerant atmosphere, as well as excellent lubricating properties and stability.

There is, therefore, a great demand for a lubricating oil composition for a compression type refrigerator having a traction mechanism which is capable of showing excellent traction performance as well as excellent lubricating properties and stability.

DISCLOSURE OF THE INVENTION

The present invention has been made in view of the above circumstance and is aimed at the provision of a lubricating oil composition for a compression type refrigerator having a traction mechanism which has excellent traction performance as well as excellent lubricating properties and stability.

The present inventors have made an earnest study and found that the above object can be achieved by compounding a base oil having a specific molecular weight, molecular structure and kinematic viscosity. The present invention has been completed based on such a finding.

Thus, the present invention provides:

1. A lubricating oil composition for a compression type refrigerator having a traction mechanism, comprising a base oil having a kinematic viscosity of 2 to 1,000 mm²/s at 40° C., said base oil comprising at least one of the following compounds (1) to (6) each having a molecular weight of 150 to 5,000 and one or more tertiary or quaternary carbons:
   (1) an alicyclic hydrocarbon compound having two or more rings in the molecule;
   (2) an ester of a carboxylic acid having a branched chain or branched chains with a polyhydric alcohol;
   (3) an ester of an alicyclic polycarboxylic acid with a $C_1$ to $C_{18}$ alcohol;
   (4) polybutene;
   (5) an alkylbenzene and/or an alkylnaphthalene with the proviso that the alkyl group is a branched-chain alkyl group; and
   (6) a paraffinic mineral oil showing a $^{13}$C-NMR spectrum in which an area of peaks at chemical shifts in the range of 30 to 100 ppm accounts for 5 to 40% of the entire peak area and/or a naphthenic mineral oil having a naphthene content, as determined by ring analysis, of 30 to 70% by mass;

2. The lubricating oil composition for a compression type refrigerator having a traction mechanism as defined in above 1, wherein the alicyclic hydrocarbon compound having two or more rings in the molecule is a compound selected from the group consisting of a hydrogenated product of a dimer of an alicyclic compound selected from the group consisting of a compound containing a bicyclo[2.2.1]heptane ring, a compound containing a bicyclo[3.2.1]octane ring, a compound containing a bicyclo[3.3.0]octane ring and a compound containing a bicyclo[2.2.2]octane ring; an alkane derivative having two or more cyclohexane rings; and an alkane derivative having at least one decalin ring and at least one cyclohexyl ring;

3. The lubricating oil composition for a compression type refrigerator having a traction mechanism as defined in above 1, wherein the ester of a carboxylic acid having a branched chain or branched chains with a polyhydric alcohol is an ester of a $C_3$ to $C_{20}$ carboxylic acid having a branched chain or branched chains with a $C_{10}$ to $C_{40}$ polyhydric alcohol having 2 to 6 hydroxyl groups;

4. The lubricating oil composition for a compression type refrigerator having a traction mechanism as defined in claim 1, wherein the ester of an alicyclic polycarboxylic acid with a $C_1$ to $C_{18}$ alcohol is an ester represented by the following general formula (II):

wherein A represents a cyclohexane ring or a cyclohexene ring, $R^4$ represents a hydrogen atom or a methyl group, X represents a hydrogen atom or $COOR^7$, Y represents a hydrogen atom or $COOR^8$, and $R^5$, $R^6$, $R^7$ and $R^8$ are the same as or different from each other and each represent a $C_3$ to $C_{18}$ branched alkyl group, a $C_3$ to $C_{10}$ cycloalkyl group, a $C_1$ to $C_{18}$ straight chained alkyl group or a $C_2$ to $C_{18}$ straight chained alkenyl group;

5. The lubricating oil composition for a compression type refrigerator having a traction mechanism as defined in any one of above 1 to 4, being used for a refrigerant selected from the group consisting of carbon dioxide, a hydrocarbon, a hydrofluorocarbon and ammonia; and 6. A refrigeration system using the lubricating oil composition for a compression type refrigerator having a traction mechanism as defined in any one of above 1 to 5.

The lubricating oil composition for a compression type refrigerator having a traction mechanism according to the present invention provides excellent traction performance in various refrigerant atmospheres used in the refrigerator and has excellent lubricating properties and stability.

BEST MODE FOR CARRYING OUT THE INVENTION

Description will be next made of the present invention in detail.

The lubricating oil composition for a compression type refrigerator of the present invention contains a compound having one or more tertiary or quaternary carbons. This compound must have a molecular weight of 150 to 5,000.

The molecular weight is preferably 200 to 2,000, more preferably 250 to 1,500.

When the molecular weight is not less than 150, good lubricating properties may be ensured so that occurrence of wear or seizure of a sliding member may be prevented. When the molecular weight is not more than 5,000, good performance may be obtained even at a low temperature and no problems are caused with respect to compatibility with a refrigerant.

As the compound having one or more tertiary or quaternary carbons used in the lubricating oil composition for a compression type refrigerator of the present invention, there may be mentioned the following compounds (1) to (6):

(1) an alicyclic hydrocarbon compound having two or more rings in the molecule;
(2) an ester of a carboxylic acid having a branched chain or branched chains with a polyhydric alcohol;
(3) an ester of an alicyclic polycarboxylic acid with a $C_1$ to $C_{18}$ alcohol;
(4) polybutene;
(5) an alkyl benzene and/or an alkyl naphthalene with the proviso that the alkyl group is a branched-chain alkyl group; and
(6) a paraffinic mineral oil showing a $^{13}$C-NMR spectrum in which an area of peaks at chemical shifts in the range of 30 to 100 ppm accounts for 5 to 40% of the entire peak area and/or a naphthenic mineral oil having a naphthene content, as determined by ring analysis, of 30 to 70% by mass.

As to above (1), the alicyclic hydrocarbon compound having two or more rings in the molecule may be (i) a hydrogenated product of a dimer of at least one alicyclic compound selected from a compound containing a bicyclo[2.2.1]heptane ring, a compound containing a bicyclo[3.2.1]octane ring, a compound containing a bicyclo[3.3.0]octane ring and a compound containing a bicyclo[2.2.2]octane ring, (ii) an alkane derivative having two or more cyclohexane rings, or (iii) an alkane derivative having at least one decalin ring and at least one cyclohexyl ring.

The hydrogenated product of a dimer of an alicyclic compound selected from a compound containing a bicyclo[2.2.1] heptane ring, a compound containing a bicyclo[3.2.1]octane ring, a compound containing a bicyclo[3.3.0]octane ring and a compound containing a bicyclo[2.2.2]octane ring (compound of above (i)) is preferably a hydrogenated product of a dimer of a bicyclo[2.2.1]heptane ring compound, particularly a compound represented by the following general formula (I):

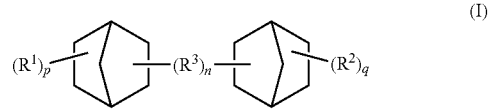

In the formula (II), $R^1$ and $R^2$ each represent a hydrogen atom or a $C_1$ to $C_3$ alkyl group, $R^3$ represents a methylene group, ethylene group or trimethylene group which may contain a methyl or ethyl substituent group as its side chain, n is 0 or 1, and p and q are each an integer of 1 to 3.

Specific examples of the compound represented by the general formula (I) include exo-2-methyl-exo-3-methyl-endo-2-[(endo-3-methylbicyclo[2.2.1]hepto-exo-2-yl)methyl]-bicyclo[2.2.1]heptane, exo-2-methyl-exo-3-methyl-endo-2-[(endo-2-methylbicyclo[2.2.1]hepto-exo-3-yl) methyl]-bicyclo[2.2.1]heptane, endo-2-methyl-exo-3-methyl-exo-2-[(exo-3-methylbicyclo[2.2.1]hepto-exo-2-yl) methyl]-bicyclo[2.2.1]heptane, endo-2-methyl-exo-3-methyl-exo-2-[(exo-2-methylbicyclo[2.2.1]hepto-exo-3-yl) methyl]-bicyclo[2.2.1]heptane, endo-2-methyl-exo-3-methyl-exo-2-[(endo-3-methylbicyclo[2.2.1]hepto-endo-2-yl)methyl]-bicyclo[2.2.1]heptane, and endo-2-methyl-exo-3-methyl-exo-2-[(endo-2-methylbicyclo[2.2.1]hepto-endo-3-yl)methyl]-bicyclo[2.2.1]heptane.

The compound represented by the general formula (I) is preferably prepared by subjecting an olefin which may have an alkyl substituent group or groups such as a methyl group, an ethyl group and a propyl group, to dimerization, hydrogenation and distillation treatments in this order.

Examples of the raw material olefin include 3-methylene-2-methylbicyclo[2.2.1]heptane, bicyclo[2.2.1]hepto-2-ene, 2-methylbicyclo[2.2.1]heptane, 2-methylbicyclo[2.2.1]hepto-2-ene, 2-methylene-3-methylbicyclo[2.2.1]heptane, 2,3-dimethylbicyclo[2.2.1]hepto-2-ene, 2-methylene-7-methylbicyclo[2.2.1]heptane, 2,7-dimethylbicyclo[2.2.1]hepto-2-ene, 2-methylene-5-methylbicyclo[2.2.1]heptane, 2,5-dimethylbicyclo[2.2.1]hepto-2-ene, 2-methylene-6-methylbicyclo[2.2.1]heptane, 2,6-dimethylbicyclo[2.2.1]hepto-2-ene, 2-methylene-1-methylbicyclo[2.2.1]heptane, 1,2-dimethylbicyclo[2.2.1]hepto-2-ene, 2-methylene-4-methylbicyclo[2.2.1]heptane, 2,4-dimethylbicyclo[2.2.1]hepto-2-ene, 2-methylene-3,7-dimethylbicyclo[2.2.1]heptane, 2,3,7-trimethylbicyclo[2.2.1]hepto-2-ene, 2-methylene-3,6-dimethylbicyclo[2.2.1]heptane, 2-methylene-3,3-dimethylbicyclo[2.2.1]heptane, 2,3,6-trimethylbicyclo[2.2.1]hepto-2-ene, 2-methylene-3-ethylbicyclo[2.2.1]heptane and 2-methyl-3-ethylbicyclo[2.2.1]hepto-2-ene.

An acid catalyst is generally used as a dimerization catalyst. Preferably used is a trifluoride complex such as a boron trifluoride diethyl ether complex, a boron trifluoride 1.5 hydrate complex or a boron trifluoride alcohol complex.

The dimerization is generally carried out at a temperature of −70 to 100° C.

The hydrogenation of a dimer of a raw material olefin is also carried out in the presence of a catalyst. The catalyst may be a hydrogenation catalyst such as nickel, ruthenium, palladium, platinum, rhodium or iridium.

The above metal is generally used in a form supported on a carrier such as diatomaceous earth, alumina, activated carbon or silica-alumina. A supported catalyst such as nickel/diatomaceous earth is particularly preferred.

The hydrogenation temperature is generally 100 to 300° C. The reaction pressure is generally ambient temperature to 19.6 MPaG (200 kg/cm$^2$G).

Specific examples of the alkane derivative having two or more cyclohexane rings (compound of above (ii)) include 2,4-dicyclohexyl-2-methylpentane, 2,4-dicyclohexylpentane, 2,4-dicyclohexyl-2-methylbutane and 1-decahydronaphthyl-1-cyclohexylethane.

Specific examples of the alkane derivative having at least one decalin ring and at least one cyclohexyl ring (compound of above (iii)) include 1-cyclohexyl-1-decalylethane.

As to above (2), the ester of a carboxylic acid having a branched chain or branched chains with a polyhydric alcohol may be an ester of a $C_3$ to $C_{20}$ carboxylic acid having a branched chain or branched chains with a $C_{10}$ to $C_{40}$ polyhydric alcohol having 2 to 6 hydroxyl groups.

Such a polyhydric alcohol may be, for example, a $C_2$ to $C_{20}$ polyhydric alcohol having 2 to 6 hydroxyl groups, such as neopentylglycol, trimethylolethane, trimethylolpropane, glycerin, pentaerythritol, dipentaerythritol and sorbitol.

As the carboxylic acid having a branched chain or branched chains, there may be mentioned a $C_3$ to $C_{20}$ carboxylic acid having a branched chain or branched chains, for example, 3-methylhexanoic acid, 2-ethylhexanoic acid, 3,5,5-trimethylhexanoic acid, isononanoic acid, isodecanoic acid and 3,5,5,7,7-pentamethyloctanoic acid.

When a plurality of carboxylic acid residues are present in the molecule of the ester of a carboxylic acid having a branched chain or branched chains with a polyhydric alcohol, it is sufficient that at least one carboxylic acid has a branched chain or branched chains.

The ester of a carboxylic acid having a branched chain or branched chains with a polyhydric alcohol may be obtained by reaction of a polyhydric alcohol with a carboxylic acid having a branched chain or branched chains or a derivative thereof such as an ester or an acid halide thereof.

As to above (3), the ester of an alicyclic polycarboxylic acid with a $C_1$ to $C_{18}$ alcohol may be an ester represented by the following general formula (II):

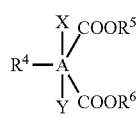

(II)

In the above formula (II), A represents a cyclohexane ring or a cyclohexene ring, $R^4$ represents a hydrogen atom or a methyl group, X represents a hydrogen atom or $COOR^7$, Y represents a hydrogen atom or $COOR^8$, and $R^5$, $R^6$, $R^7$ and $R^8$ are the same as or different from each other and each represent a $C_3$ to $C_{18}$ branched alkyl group, a $C_3$ to $C_{10}$ cycloalkyl group, a $C_1$ to $C_{18}$ straight chained alkyl group or a $C_2$ to $C_{18}$ straight chained alkenyl group.

As the $C_1$ to $C_{18}$ alcohol, there may be mentioned a $C_3$ to $C_{18}$ branched alcohol, a $C_3$ to $C_{10}$ cycloalcohol and a $C_1$ to $C_{18}$ straight chained alcohol.

Examples of the $C_3$ to $C_{18}$ branched alcohol include isopropanol, isobutanol, sec-butanol, isopentanol, isohexanol, 2-methylhexanol, 1-methylheptanol, 2-methylheptanol, isoheptanol, 2-ethylhexanol, 2-octanol, isooctanol, 3,5,5-trimethylhexanol, isodecanol, isoundecanol, isododecanol, isotridecanol, isotetradecanol, isopentadecanol, isohexadecanol, isooctadecanol, 2,6-dimethyl-4-heptanol and isononanol.

Examples of the $C_3$ to $C_{10}$ cycloalcohol include cyclohexanol, methylcyclohexanol and dimethylcyclohexanol.

Examples of the $C_1$ to $C_{18}$ straight chained alcohol include methanol, ethanol, n-propanol, n-butanol, n-pentanol, n-hexanol, n-heptanol, n-octanol, n-nonanol, n-decanol, n-undecanol, n-dodecanol, n-tridecanol, n-tetradecanol, n-pentadecanol, n-hexadecanol, n-octadecanol and 9-octadecenol.

Specific examples of the cyclohexanepolycarboxylic acid and cyclohexenepolycarboxylic acid include 1,2-cyclohexane-dicarboxylic acid, 4-cyclohexene-1,2-dicarboxylic acid, 1-cyclohexene-1,2-dicarboxylic acid, 1,3-cyclohexanedicarboxylic acid, 1,4-cyclohexanedicarboxylic acid, 3-methyl-1,2-cyclohexanedicarboxylic acid, 4-methyl-1,2-cyclohexanedicarboxylic acid, 3-methyl-4-cyclohexene-1,2-dicarboxylic acid, 4-methyl-4-cyclohexene-1,2-dicarboxylic acid, 1,2,4-cyclohexane-tricarboxylic acid, 1,3,5-cyclohexanetricarboxylic acid and 1,2,4,5-cyclohexanetetracarboxylic acid.

The ester represented by the general formula (II) may be obtained by reacting a $C_1$ to $C_{18}$ alcohol with a cyclohexanepolycarboxylic acid, cyclohexenepolycarboxylic acid or a reactive derivative thereof such as an ester or an acid halide thereof.

As to above (4), polybutene, which is a polymer of isobutylene, is generally used in a lubricating oil. Isobutylene may contain other $C_4$ fractions such as n-butene.

If desired, a hydrogenated product of the polymer may be also used.

As to above (5), it is necessary that the alkyl group of each of the alkylbenzene and alkylnaphthalene should have at least one tertiary or quaternary carbon, namely should be a branched alkyl group.

The branched-chain alkyl group is preferably a $C_5$ to $C_{50}$ branched alkyl group, more preferably a $C_{10}$ to $C_{40}$ branched alkyl group.

As to above (6), the paraffinic mineral oil must show a $^{13}C$-NMR spectrum in which an area of peaks at chemical shifts in the range of 30 to 100 ppm accounts for 5 to 40%, preferably 10 to 30%, of the entire peak area.

The naphthenic mineral oil must have a naphthene content of 30 to 70% by mass, preferably 40 to 60% by mass.

The naphthene content of the naphthenic mineral oil is as determined by ring analysis (ASTM D2140).

The paraffinic mineral oil and the naphthenic mineral oil preferably have a sulfur content of not more than 0.05% by mass, more preferably not more than 0.03% by mass.

In the lubricating oil composition for a compression type refrigerator of the present invention, the above compounds (1) to (6) may be contained singly or in combination of two or more thereof.

The lubricating oil containing at least one of the above compounds (1) to (6) each of which is a compound containing at least one tertiary carbon or quaternary carbon in the molecule thereof exhibits excellent traction properties in the environment of various refrigerants and has a traction coefficient of 0.03 or more in a refrigerant atmosphere.

The base oil used in the lubricating oil composition for a compression type refrigerator of the present invention contains not less than 70% by mass, preferably not less than 80% by mass, of the above compound or compounds containing at least one tertiary carbon or quaternary carbon in the molecule thereof.

As a base material which may be compounded in addition to the compounds (1) to (6), there may be mentioned various synthetic oils (other than those described above) such as a mineral oil, an alkylbenzene and an alkylnaphthalene.

The base oil containing 100 to 70% by mass of the above compound or compounds containing at least one tertiary carbon or quaternary carbon in the molecule thereof and 0 to 30% by mass of the base material must have a kinematic viscosity in the range of 2 to 1,000 mm$^2$/s at 40° C.

The kinematic viscosity is preferably 5 to 500 mm$^2$/s, more preferably 5 to 150 mm$^2$/s.

When the kinematic viscosity is not less than 2 mm$^2$/s, good lubrication property is obtainable so that there is no fear of occurrence of wear and seizure of a sliding part. On the other hand, when the kinematic viscosity is not more than 1,000 mm$^2$/s, good low temperature performance is obtainable and, moreover, the compatibility with a refrigerant is satisfactory.

In the lubricating oil composition for a compression type refrigerator of the present invention, it is preferable to incorporate, as a lubrication improver, a phosphorus-based lubrication improver such as a phosphate ester, an acid phosphate ester, a phosphite ester, an acid phosphite ester, a thiophosphate ester and an amine salt thereof.

Specific examples of the phosphorus-based lubrication improver include tricresyl phosphate, trithiophenyl phosphate, tri(nonylphenyl) phosphite, dioleyl hydrogen phosphite and 2-ethylhexyldiphenyl phosphite.

The compounding amount of the phosphorus-based lubrication improver is preferably 0.1 to 10% by mass, more preferably 0.2 to 5% by mass.

In the lubricating oil composition for a compression type refrigerator of the present invention, it is preferable to incorporate an epoxy compound.

Specific examples of the epoxy compound include phenyl glycidyl ether, an alkyl glycidyl ether, an alkylene glycol glycidyl ether, cyclohexene oxide, an α-olefin oxide and epoxidized soy bean oil.

Above all, phenyl glycidyl ether, an alkyl glycidyl ether, an alkylene glycol glycidyl ether, cyclohexene oxide and an α-olefin oxide are preferred for reasons of compatibility.

Each of the alkyl group of the alkyl glycidyl ether and the alkylene group of the alkylene glycol glycidyl ether may be branched and generally has a carbon number of 3 to 30, preferably 4 to 24, particularly 6 to 16.

The α-olefin oxide generally has a carbon number of 4 to 50, preferably 4 to 24, particularly 6 to 16.

The compounding amount of the acid scavenger is preferably 0.1 to 10% by mass, more preferably 0.2 to 5% by mass.

In the lubricating oil composition for a compression type refrigerator of the present invention, it is preferable to incorporate a phenol-type antioxidant or an aromatic amine-type antioxidant.

Specific examples of the phenol-type antioxidant include 2,6-di-tert-butyl-4-methylphenol, 2,6-di-tert-butyl-4-ethylphenol, 2,2'-methylenebis(4-methyl-6-tert-butylphenol). Specific examples of the amine-type antioxidant include phenyl-α-naphthylamine and N,N'-diphenyl-p-phenylenediamine.

The compounding amount of the antioxidant is preferably 0.1 to 10% by mass, more preferably 0.2 to 5% by mass.

In the lubricating oil composition for a compression type refrigerator of the present invention, it is preferable to incorporate an antifoaming agent such as silicone oil or fluorinated silicone oil.

The compounding amount of the antifoaming agent is preferably 1 to 50 ppm.

As a lubrication improver other than the above phosphorus-based lubrication improver, there may be used organic sulfur compound-based agents such as monosulfides, polysulfides, sulfoxides, sulfones, thiosulfinates, vulcanized fats and oils, thiocarbonates, thiophenes, thiazoles and esters of methanesulfonic acid; fatty acid-based agents such as higher fatty acids, hydroxyaryl fatty acids, carboxylic acid-containing polyhydric alcohol esters and metal soap; fatty acid ester-based agents such as polyhydric alcohol esters and acrylic acid esters; organic chlorine compound-based agents such as chlorinated hydrocarbons and chlorinated carboxylic acid derivatives; organic fluorine compound-based agents such as fluorinated aliphatic carboxylic acids, fluorinated ethylene resins, fluorinated alkylpolysiloxanes and fluorinated graphite; alcohol-based agents such as higher alcohols; and metal compound-based agents such as naphthenic acid salts (e.g. lead naphthenate), fatty acid salts (e.g. lead salts of fatty acids), thiophosphoric acid salts (e.g. zinc dialkyldithiophosphates), thiocarbamic acid salts, organomolybdenum compounds, organotin compounds, organogermanium compounds and boric acid esters.

Further, if desired, the lubricating oil composition for a compression type refrigerator of the present invention may be added with various additives generally employed in the conventional lubricating oil compositions for refrigerants, such as a metal deactivator, a detergent dispersant, a kinematic index improver, an oiliness agent, an antiwear agent, a rust inhibitor, a corrosion inhibitor and a pour point depressant.

As a refrigerant to which the lubricating oil composition for a compression type refrigerator of the present invention is applied, there may be used carbon dioxide, hydrofluorocarbons such as R134a, fluorine compounds such as tetrafluoromethane (R14), hexafluoroethane (R116) and octafluoropropane (R218), ammonia and hydrocarbons such as propane, cyclopropane, butane, isobutene and pentane.

EXAMPLES

The present invention will be next described in further detail by way of Examples and Comparative Example but is not limited to these Examples in any way.

The traction coefficient of the base oil used in each of Examples and Comparative Example and the performance of the lubricating oil composition for a compression type refrigerator obtained in each of Examples and Comparative Example were determined in the manner as shown below.

(1) Traction Coefficient

The traction coefficient was measured using a two-cylinder rolling tester.

A pair of metal cylinders (material: bearing steel SUJ-2, diameter: 40 mm, thickness: 10 mm, hardness: RC61, surface roughness: Rms 0.030 μm, driven cylinder: drum-shape with a radius of curvature of 20 mm, driving cylinder: flat shape without crowning) were disposed in contact with each other. In the atmosphere of a carbon dioxide refrigerant (blown at a rate of 5 L/hr), both cylinders were rotated, while applying a surface pressure (Pmax=1.1 GPa) therebetween at a mean velocity of 4.1 m/s (1960 rpm). In this case, a difference in rotational velocity was given between the cylinders so that a slip ratio (value (%) obtained by dividing the difference in velocity between the driven and driving sides by the mean velocity) was 6%. The tangential force F (traction force) generated at the contact portion between the two cylinders was measured to determine the traction coefficient μ (=F/147.1).

The oil temperature in the measurement was 80° C.

(2) Sealed Tube Test

In a glass tube, Fe, Cu and Al as a catalyst were placed, to which 1 g of the lubricating oil composition for a compression type refrigerator per 4 mL of a refrigerant (carbon dioxide) (moisture content: 200 ppm) was charged together with 200 torr of air, after which the tube was sealed.

The tube was maintained at 175° C. for 30 days. Thereafter, the appearance of the oil, appearance of the catalyst, total acid value and presence or absence of sludge were evaluated.

(3) Closed Falex Test

A Falex test machine was used. The pin and block were AISIC1137 and SAE3135, respectively.

The pin and block were set. In a testing vessel were charged 100 g of the lubricating oil composition for a compression type refrigerator and 1 MPa of carbon dioxide. A wear test was then performed at a revolution speed of 300 rpm, a temperature of 80° C. and a load of 1,335 N for a testing time of 1 hour to measure the wear amount (mg) of the pin.

(4) Other Measurement Method:

Kinematic viscosity (40° C.) was measured in accordance with JIS K 2283.

Preparation Example 1

Production of Hydrogenated Product of Dimer of Compound having bicyclo[2.2.1]heptane Ring:

In a 1 L stainless steel autoclave 350.5 g (5 moles) of crotonaldehyde and 198.3 g (1.5 moles) of dicyclopentadiene were charged and reacted at 170° C. for 2 hours with stirring.

The reaction solution was cooled to room temperature and added with 22 g of 5% ruthenium-carbon catalyst (manufactured by N.E. Chemcat Corporation). Then hydrogenation was carried out at a temperature of 180° C. under a hydrogen pressure of 6.86 MPaG (70 kg/cm$^2$G) for four hours.

After cooling, the catalyst was removed by filtration and the filtrate was distilled at 70° C./0.12 kPa (0.9 mmHg) to obtain 242 g of a fraction.

The obtained fraction was analyzed by mass spectrometry and nuclear magnetic resonance spectrometry to reveal that the fraction was 2-hydroxymethyl-3-methylbicyclo[2.2.1]heptane.

A dehydration reaction of the obtained fraction was then carried out in a quartz glass flow-type atmospheric pressure reaction tube (outer diameter: 20 mm, length: 500 mm) containing 15 g of γ-alumina (Norton Alumina SA-6273 manufactured by Nikka Seiko Co., Ltd.) at a temperature of 270° C. and a weight space velocity (WHSV) of 1.07 hr$^{-1}$ to obtain 196 g of a dehydrated product of 2-hydroxymethyl-3-methylbicyclo[2.2.1]heptane containing 65% by mass of 2-methylene-3-methylbicyclo[2.2.1]heptane and 28% by mass of 2,3-dimethylbicyclo[2.2.1]hepto-2-ene.

In a 500 mL four necked flask, 9.5 g of activated clay (GALLEON EARTH NS manufactured by Mizusawa Industrial Chemicals, Ltd.) and 190 g of the above-obtained olefin compound were placed and subjected to dimerization at 145° C. for 3 hours with stirring.

The reaction mixture was filtered to remove the activated clay. The filtrate was placed in a 1 L autoclave together with 6 g of nickel/diatomaceous earth hydrogenation catalyst (N-113 manufactured by JGC Corporation) and subjected to hydrogenation at a temperature of 160° C. under a hydrogen pressure of 3.92 MPaG (40 kg/cm$^2$G) for 4 hours.

After termination of the reaction, the catalyst was removed by filtration. The filtrate was distilled under vacuum to obtain 116 g of a hydrogenated dimer as a fraction with a boiling point of 126 to 128° C./0.027 kPa (0.2 mmHg).

This fraction was analyzed by mass spectrometry and nuclear magnetic resonance spectrometry to reveal that the fraction was a $C_{18}$ saturated hydrocarbon (molecular weight 246) having two norbornane rings in its molecule and represented by the general formula (I).

This faction was found to have a kinematic viscosity of 21.80 mm$^2$/s (40° C.)

Examples 1 to 8 and Comparative Example 1

The base oil, lubrication improver, acid scavenger, antioxidant and antifoaming agent shown below were mixed in amounts shown in Table 1 to obtain lubricating compositions for a compression type refrigerator. The performance of each of the obtained lubricating compositions for a compression type refrigerator was evaluated. The results are shown in Table 1.

Base Oil:

A1: Compound produced in Preparation Example 1 (kinematic viscosity: 21.80 mm$^2$/s (40° C.))

A2: 2,4-Dichlorohexyl-2-methylpentane (SANTOTRA C50 manufactured by Findett Inc., (kinematic viscosity: 21.8 mm$^2$/s (40° C.))

A3: Naphthenic mineral oil (naphthenic content: 40% by mass, sulfur content: 0.03% by mass, kinematic viscosity: 56 mm$^2$/s (40° C.))

A4: Paraffinic mineral oil (showing a $^{13}$C-NMR spectrum in which an area of peaks at chemical shifts in the range of 30 to 100 ppm accounts for 30% of the entire peak area, kinematic viscosity: 100 mm$^2$/s (40° C.)

The $^{13}$C-NMR spectrum is measured under the following conditions:

Apparatus: Model JNM-EX400 $^{13}$C-NMR apparatus manufactured by JEOL Ltd.
  Method: Complete proton decoupling
  Concentration: 250 mg/1 mL
  Solvent: Deuterochloroform (CDCl$_3$)
  Temperature: 23.2° C.
  Pulse width: 45°
  Pulse repetition time: 3.0 seconds
  Integration: 10,000 times]

A5: Polybutene (kinematic viscosity: 68 mm$^2$/s (40° C.))

A6: Poly-α-olefin (kinematic viscosity: 63 mm$^2$/s (40° C.))

A7: Pentaerythritol ester of a 1:1 mixture of 2-ethylhexanoic acid and 3,5,5-trimethylhexanoic acid (kinematic viscosity: 65 mm$^2$/s (40° C.))

A8: Polypropylene glycol (kinematic viscosity: 42 mm$^2$/s (40° C.))

Lubrication Improver, Acid Scavenger, Antioxidant and Antifoaming Agent:

B1: Lubrication improver: tricresyl phosphate

B2: Acid scavenger: $C_{14}$ α-olefin oxide

B3: Antioxidant: 2,6-di-tert-butyl-4-methylphenol

B4: Antifoaming agent: silicone-based antifoaming agent

TABLE 1

|  |  | Example 1 | Example 2 | Example 3 | Example 4 | Example 5 |
|---|---|---|---|---|---|---|
| Base oil A1 | % by mass | 97.5 |  |  |  |  |
| Base oil A2 | % by mass |  | 97.5 |  |  |  |
| Base oil A3 | % by mass |  |  | 97.499 |  |  |
| Base oil A4 | % by mass |  |  |  | 97.499 |  |
| Base oil A5 | % by mass |  |  |  |  | 97.5 |
| Base oil A6 | % by mass |  |  |  |  |  |
| Base oil A7 | % by mass |  |  |  |  |  |
| Base oil A8 | % by mass |  |  |  |  |  |

TABLE 1-continued

|  |  |  |  |  |  |  |
|---|---|---|---|---|---|---|
| Lubrication improver B1 | % by mass | 1 | 1 | 1 | 1 | 1 |
| Acid scavenger B2 | % by mass | 1 | 1 | 1 | 1 | 1 |
| Antioxidant B3 | % by mass | 0.5 | 0.5 | 0.5 | 0.5 | 0.5 |
| Antifoaming agent B4 | ppm |  |  | 0.001 | 0.001 |  |
| Traction coefficient | μ | 0.10 | 0.10 | 0.06 | 0.04 | 0.07 |
| Sealed tube test | Appearance of composition | Good | Good | Good | Good | Good |
|  | Appearance of catalyst | Good | Good | Good | Good | Good |
|  | Sludge | None | None | None | None | None |
|  | Acid value (mgKOH/g) | 0.01> | 0.01> | 0.01> | 0.01> | 0.01> |
| Falex wear amount | mg | 10 | 11 | 5 | 3 | 8 |

|  |  | Example 6 | Example 7 | Example 8 | Comparative Example 1 |
|---|---|---|---|---|---|
| Base oil A1 | % by mass |  |  | 88 |  |
| Base oil A2 | % by mass |  |  |  |  |
| Base oil A3 | % by mass |  |  |  |  |
| Base oil A4 | % by mass |  |  |  |  |
| Base oil A5 | % by mass |  |  |  |  |
| Base oil A6 | % by mass | 97.5 |  |  |  |
| Base oil A7 | % by mass |  | 97.5 |  |  |
| Base oil A8 | % by mass |  |  |  | 97.5 |
| Lubrication improver B1 | % by mass | 1 | 1 | 5 | 1 |
| Acid scavenger B2 | % by mass | 1 | 1 | 5 | 1 |
| Antioxidant B3 | % by mass | 0.5 | 0.5 | 2 | 0.5 |
| Antifoaming agent B4 | ppm |  |  |  |  |
| Traction coefficient | μ | 0.03 | 0.03 | 0.10 | 0.01 |
| Sealed tube test | Appearance of composition | Good | Good | Good | Light yellow |
|  | Appearance of catalyst | Good | Good | Good | Good |
|  | Sludge | None | None | None | None |
|  | Acid value (mgKOH/g) | 0.01> | 0.02> | 0.01> | 0.1 |
| Falex wear amount | mg | 6 | 15 | 6 | Galling |

From Table 1, it is understood that the lubricating oil compositions of Examples have excellent traction performance, a traction coefficient of 0.03 or more in the atmosphere of a carbon dioxide refrigerant, excellent power transmission capability, excellent stability and excellent lubricating property.

In contrast, the lubricating oil composition of Comparative Example has low traction performance and a traction coefficient of 0.01 in the atmosphere of a carbon dioxide refrigerant and is no good in stability and lubricating property.

[Industrial Applicability]

The present invention pertains to a lubricating oil composition for a compression type refrigerator and may be used as a refrigerator oil for a car air conditioner, a gas heat pump (GHP), an air conditioner, a cold storage, a vending machine, a showcase, a water heater system and a floor heating system.

The invention claimed is:

1. A compression type refrigeration system having a traction mechanism within a compressor and comprising a lubricating oil composition, the lubricating oil composition comprising a base oil having a kinematic viscosity of 2 to 1,000 $mm^2/s$ at 40° C., said base oil comprising at least one compound selected from the group consisting of exo-2-methyl-exo-3-methyl-endo-2-[(endo-3-methylbicyclo[2.2.1]hepto-exo-2-yl)methyl]-bicyclo[2.2.1]heptane, exo-2-methyl-exo-3-methyl-endo-2-[(endo-2-methylbicyclo[2.2.1]hepto-exo-3-yl)methyl]-bicyclo[2.2.1]heptane, endo-2-methyl-exo-3-methyl-exo-2-[(exo-3-methylbicyclo[2.2.1]hepto-exo-2-yl)methyl]-bicyclo[2.2.1]heptane, endo-2-methyl-exo-3-methyl-exo-2-[(exo-2-methylbicyclo[2.2.1]hepto-exo-3-yl)methyl]-bicyclo[2.2.1]heptane, endo-2-methyl-exo-3-methyl-exo-2-[(endo-3-methylbicyclo[2.2.1]hepto-endo-2-yl)methyl]-bicyclo[2.2.1]heptane, and endo-2-methyl-exo-3-methyl-exo-2[(endo-2-methylbicyclo[2.2.1]hepto-endo-3-yl)methyl]-bicyclo[2.2.1]heptane.

2. The refrigeration system as defined in claim 1 further comprising a refrigerant selected from the group consisting of carbon dioxide, a hydrocarbon, a hydrofluorocarbon and ammonia.

3. The refrigeration system as defined in claim 1, wherein said base oil comprises
exo-2-methyl-exo-3-methyl-endo-2-[(endo-3-methylbicyclo[2.2.1]hepto-exo-2-yl)methyl]-bicyclo[2.2.1]heptane.

4. The refrigeration system as defined in claim 1, wherein said lubricating oil composition comprises not less than 70% by mass of said base oil.

5. The refrigeration system as defined in claim 1, wherein said lubricating oil composition comprises not less than 80% by mass of said base oil.

6. The refrigeration system as defined in claim 1, wherein said lubricating oil composition has a kinematic viscosity of 5 to 500 mm$^2$/s at 40° C.

7. The refrigeration system as defined in claim 1, wherein said lubricating oil composition has a kinematic viscosity of 5 to 150 mm$^2$/s at 40° C.

8. A process for making the refrigeration system as defined in claim 1, comprising adding said lubricating oil composition to a compression type refrigeration system having a traction mechanism within a compressor.

9. The refrigeration system as defined in claim 1, wherein said base oil comprises exo-2-methyl-exo-3-methyl-endo-2-[(endo-2-methylbicyclo[2.2.1]hepto-exo-3-yl)methyl]-bicyclo[2.2.1]heptane.

10. The refrigeration system as defined in claim 1, wherein said base oil comprises endo-2-methyl-exo-3-methyl-exo-2-[(exo-3-methylbicyclo[2.2.1]hepto-exo-2-yl)methyl]-bicyclo[2.2.1]heptane.

11. The refrigeration system as defined in claim 1, wherein said base oil comprises endo-2-methyl-exo-3-methyl-exo-2-[(exo-2-methylbicyclo[2.2.1]hepto-exo-3-yl)methyl]-bicyclo[2.2.1]heptane.

12. The refrigeration system as defined in claim 1, wherein said base oil comprises endo-2-methyl-exo-3-methyl-exo-2-[(endo-3-methylbicyclo[2.2.1]hepto-endo-2-yl)methyl]-bicyclo[2.2.1]heptane.

13. The refrigeration system as defined in claim 1, wherein said base oil comprises endo-2-methyl-exo-3-methyl-exo-2-[(endo-2-methylbicyclo[2.2.1]hepto-endo-3-yl)methyl]-bicyclo[2.2.1]heptane.

* * * * *